United States Patent
Wei et al.

(10) Patent No.: US 10,908,948 B2
(45) Date of Patent: Feb. 2, 2021

(54) MULTIPLE APPLICATION INSTANCES IN OPERATING SYSTEMS THAT UTILIZE A SINGLE PROCESS FOR APPLICATION EXECUTION

(71) Applicant: VMware, Inc., Palo Alto, CA (US)

(72) Inventors: Yuping Wei, Beijing (CN); Ke Xiao, Beijing (CN); Hongsheng Li, Beijing (CN); An Min Gong, Beijing (CN); Wenshuo Chen, Beijing (CN)

(73) Assignee: VMWARE, INC, Palo Alto, CA (US)

( * ) Notice: Subject to any disclaimer, the term of this patent is extended or adjusted under 35 U.S.C. 154(b) by 293 days.

(21) Appl. No.: 15/945,080

(22) Filed: Apr. 4, 2018

(65) Prior Publication Data
US 2019/0310882 A1 Oct. 10, 2019

(51) Int. Cl.
*G06F 9/48* (2006.01)

(52) U.S. Cl.
CPC .................... *G06F 9/4881* (2013.01)

(58) Field of Classification Search
CPC .................................................. G06F 9/4881
See application file for complete search history.

(56) References Cited

U.S. PATENT DOCUMENTS

| | | | | |
|---|---|---|---|---|
| 2009/0235200 A1* | 9/2009 | Deutsch | .................. | G06F 9/451 715/783 |
| 2010/0138639 A1* | 6/2010 | Shah | .................. | H04L 63/1425 712/227 |
| 2010/0223613 A1* | 9/2010 | Schneider | .......... | G06F 9/45558 718/1 |
| 2015/0347179 A1* | 12/2015 | Barraclough | ......... | G06F 9/4881 718/103 |
| 2016/0210130 A1* | 7/2016 | Sankaranarasimhan | ..................... | G06F 21/53 |

OTHER PUBLICATIONS

Reconstructing Tabbed Browser Sessions Using Metadata Associations Sriram Raghavan and S.V. Raghavan (Year: 2016).*
"Firefox" user manual Floss Manuals https://web.archive.org/web/20160418162347/http://en.flossmanuals.net/_booki/firefox/firefox.pdf (Year: 2011).*
BrowserCloud: A Personal Cloud for Browser Session Migration and Management Junjie Feng and Aaron Harwood (Year: 2015).*

(Continued)

*Primary Examiner* — Emerson C Puente
*Assistant Examiner* — Paul V Mills
(74) *Attorney, Agent, or Firm* — Thomas | Horstemeyer, LLP

(57) ABSTRACT

Various examples for providing multiple instances of a client application in operating systems that limit execution of the client application to a single process are disclosed. A client device can include an operating system natively configured to generate a single process for an execution of the client application on the client device. A client application can be configured to, in the single process, generate sub-processes for execution of separate instances of the client application. The client application can include at least one user interface that permits creation of, termination of, or toggling between various instances of the client application.

20 Claims, 10 Drawing Sheets

(56) References Cited

OTHER PUBLICATIONS

Getting started with the Firefox for Android tablet browser Mozilla Support web.archive.org/web/20160909071925/https://support.mozilla.org/en-US/kb/getting-started-firefox-android-tablet-browser (Year: 2016).*

Performance Evaluation of Distributed Data Delivery on Mobile Devices Using WebRTC Arto Heikkinen, Timo Koskela, Mika Ylianttila (Year: 2015).*

Temporary user tracking in major browsers and Cross-domain information leakage and attacks p. 7, 8, 19, and 20 Amit Klein (Year: 2008).*

The Best Firefox Ever Nick Nguyen blog.mozilla.org/blog/2017/06/13/faster-better-firefox/ (Year: 2017).*

Android Manifest File for Mozilla Firefox, "AndroidManifest.xml.in" hg.mozilla.org/releases/mozilla-beta/file/56b6d637e647c0f952d49fee9dde8e844ff8279c/mobile/android/base/AndroidManifest.xml.in (Year: 2018).*

Exploring Android Processes Kelvin Ma https://medium.com/@kelvinma/exploring-android-processes-bf74ba63552c (Year: 2018).*

Android Developers Guide sections: App Manifest, <activity>, Activity web.archive.org/web/20170716130448/https://developer.android.com/guide/topics/manifest/manifest-intro.html (Year: 2017).*

* cited by examiner

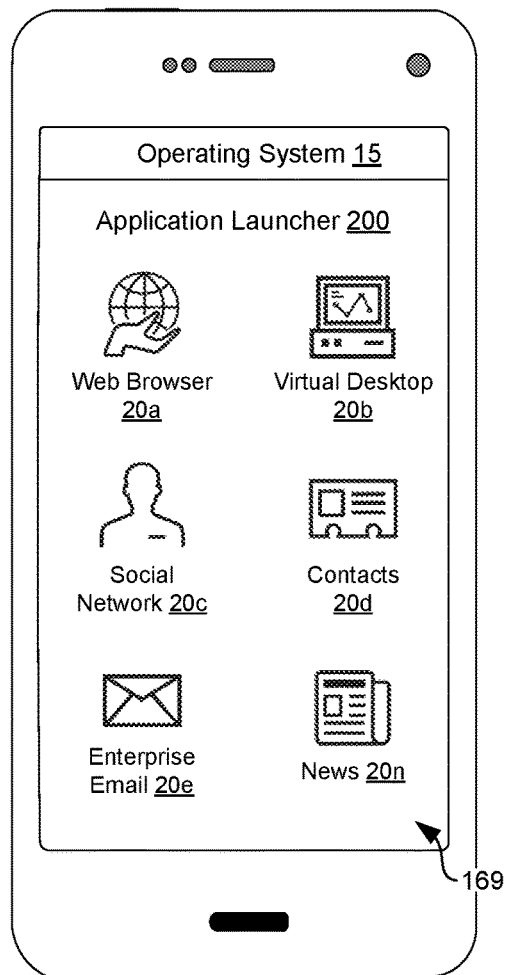
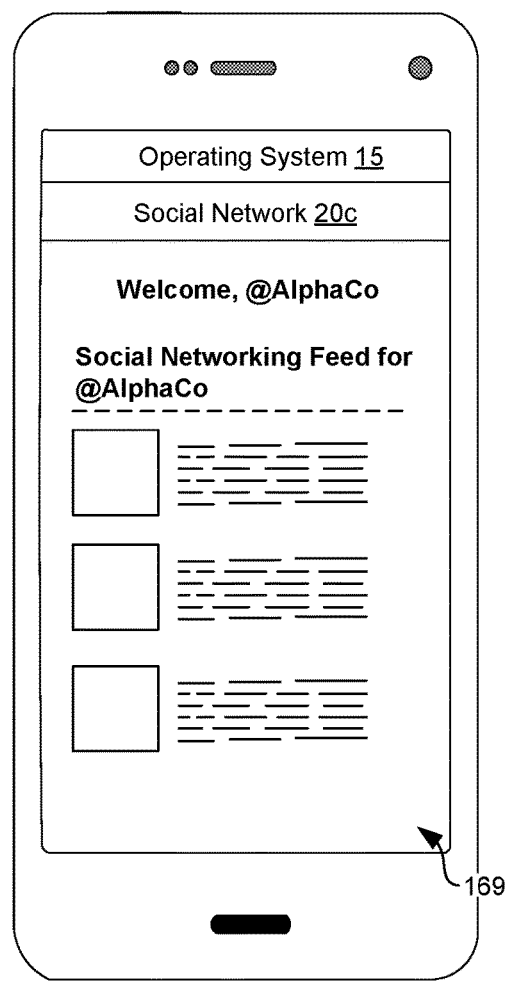
FIG. 4A
FIG. 4B

MULTIPLE APPLICATION INSTANCES IN OPERATING SYSTEMS THAT UTILIZE A SINGLE PROCESS FOR APPLICATION EXECUTION

BACKGROUND

Android® is an operating system offered by Google, Inc. that was developed using a modified form of the Linux kernel. Android® was designed primarily for touch-screen mobile devices, such as smartphones and tablets. However, versions of Android® are now available for personal computers, televisions, automotive systems, video game consoles, digital cameras, set-top-boxes, and wearable devices, such as a smart watches. Applications, commonly referred to as "apps" or "mobile apps," that execute in the Android® operating system are written in the Java® programming language using an Android®-specific software development kit (SDK). The applications are then compiled to bytecode for the Java® virtual machine and then translated to Dalvik bytecode and stored as Dalvik executable (.dex) or optimized Dalvik executable (.odex) files. These files can be packaged with others to form an application package (APK) file, which can be used by the operating system to install and execute an application.

Each application executing in the Android® operating system runs in a separate process, while having its own Dalvik virtual machine instance and unique process identifier. In other words, an application has a one-to-one relationship with a process running in the operating system. Despite the popularity of the Android® operating system, it has several limitations, especially for developers trying to accomplish particular tasks. For instance, due to the one-to-one relationship between an application and a process, multiple instances of the same application cannot be opened on the same user device without creating additional installations of the same application. Moreover, the one-to-one relationship between an application and a process in the Android® operating system makes the use of global or static variables difficult.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

FIG. 4A is a drawing of an application launcher of a conventional operating system to launch one or more client applications installed on a client device.

FIG. 4B is a drawing of a single instance of a social networking-type of client application executed in a single process of the operating system.

DETAILED DESCRIPTION

Figure 1:
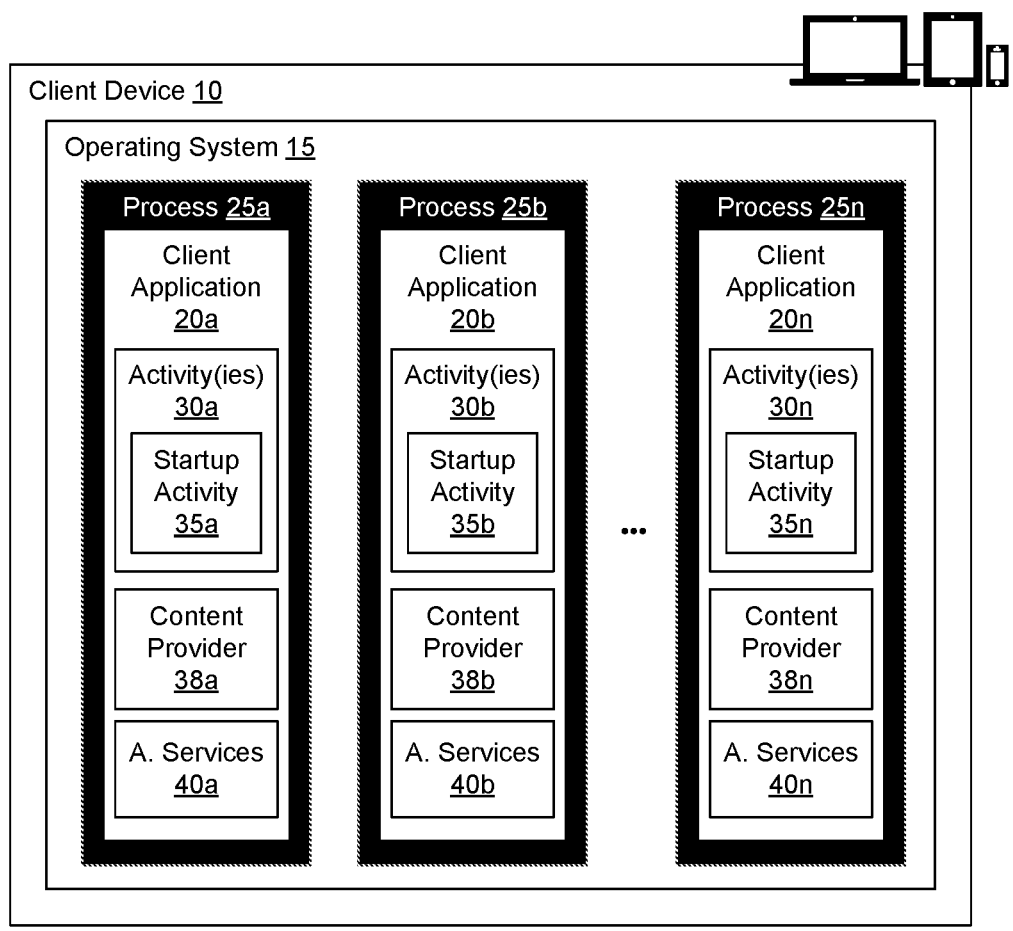
FIG. 1 is a schematic diagram that illustrates an operating system executable on a client device that generates a single process for execution of a client application.

The present disclosure relates to executing multiple instances of a client application on various operating systems, specifically those that limit execution of a client application to a single process, such as Android®. As noted above, the Android® operating system imposes limitations due to its default behavior, which inhibits developers from accomplishing particular functionality in client applications. For instance, due to the one-to-one relationship between an application and a process, the operating system prohibits multiple instances of the same application being opened on the same user device. Moreover, the one-to-one relationship between a client application and a process in the Android® operating system makes the use of global or static variables difficult. Notably, in the Android® operating system, processes, activities, and services are associated with the "android:process" attribute defined in a manifest file, meaning all instances of the activities or services execute in the same pre-defined process. As such, the Android® operating system does not easily support symmetrical processes.

Thus, examples are described herein for executing multiple instances of the same client application in an operating system having a software architecture that limits a client application to a single operating system-level process. Examples described herein employ class inheritance and instance management to implement symmetrical processes to provide multiple instances of a client application. For instance, a user can have a single social networking-type application, such as Facebook®, Instagram®, or Twitter®, installed on his or her client device. However, according to the examples described herein, the user can execute multiple instances of the social networking-type application to, for instance, log-in to different social networking accounts at the same time. Similarly, a user can have a single email client-type application, such as Outlook®, installed on his or her client device. The user can execute multiple instances of the email client-type application to, for instance, log-in to different email accounts at the same time. As such, the user can log-in to a personal email account and an enterprise email account in separate instances of the same client application.

According to one example, a system for providing multiple instances of a client application can include, for instance, a client device configured to provide an operating system configured to generate a single process for an execution of the client application on the client device, such as Android®. When a user launches a client application, the client device, through the operating system, can generate a single process for execution of a client application.

The system can also include a client application configured to, in the single process, generate a first sub-process for execution of a first instance of the client application as well as generate a second sub-process for execution of a second instance of the client application. The client application can also maintain a state of the first instance and the second instance of the client application. Further, the client application can display at least one user interface that permits a selection of the first instance of the client application or the second instance of the client application, as well as other instances. The user interface can be used by an end user to toggle between or terminate various instances of the client application.

The examples described herein for providing multiple instances of a client application are directed towards improvements in computing systems that utilize, for instance, operating systems that natively limit execution of a client application to a single operating system-level process. Moreover, the examples described herein are directed to using processes, such as threads that execute sequentially or in parallel, in a manner that efficiently utilizes computing resources, such as access to a hardware processor and use of random access memory (RAM) and other memory.

Turning now to FIG. 1, a client device 10 is shown that includes an operating system 15, also referred to as an OS. The operating system 15 generally includes software that manages computer hardware and software resources and provides common routines, services, an application programming interfaces (API) for computer programs to operate on the client device 10. The operating system 15 can also manage input/output operations, such as receiving touchscreen inputs or rendering user interfaces on a display. The operating system 15 can also perform task scheduling for efficient use of resources of the client device 10, such as allocation of processor time, storage, printing, and other resources. In some examples, the operating system 15 can include the Android® operating system. In additional examples, the operating system 15 can include other operating systems 15 having functionality similar to the Android® operating system, as will be discussed.

As can be appreciated, an end user of the client device 10 can interact with the operating system 15 to select client applications 20a . . . 20n (collectively "client applications 20") to run on the client device 10. Client applications 20 can include, for example, word processing applications, social networking applications, email client applications, virtual desktop applications, as well as other applications as can be appreciated. The client applications 20 can also be referred to as "apps" or "mobile apps" that execute in the operating system 15.

In some examples, the client applications 20 can be written using one or more programming languages, such as Java®, that utilize a software development kit (SDK) specific to the operating system 15. For instance, in examples in which the operating system 15 includes Android®, the client applications 20 can utilize the Android® SDK. The client applications 20 can be compiled to bytecode for execution in a Java® virtual machine or a Dalvik virtual machine on the client device 10. In some examples, the client applications 20 can include application package (APK) files, which can be used by the operating system 10 to install and execute the client applications 20. The application package files can include a manifest file, as will be discussed.

When client applications 20 are selected by an end user, the operating system 15 spawns processes 25a . . . 25n (collectively "processes 25") for execution of the client applications 20. Processes 25 can include, for instance, threads that are processed by software and hardware of the client device 10 to execute client applications 20. As shown in FIG. 1, the operating system 15 can spawn a process 25 for each client application 20. In other words, the operating system 15 imposes a one-to-one restriction between a client application 20 and a process 25. As such, only a single instance of a client application 20 can be executed. For instance, assume an end user has opened an email client-type of client application 20 on the client device 10 by selecting an icon for the client application 20 in an application launcher. If a user again selects the icon for the client application 20, the client application 20 already executing would merely become active in the operating system 15 and shown in a display. Another instance of the same client application 20 would not be spawned.

The client applications 20 include one or more activities 30a . . . 30n (collectively "activities 30"). Activities 30 can include classes or functions that perform routines as specified by developers of the client applications 20 in source code. The routines can be used to present a user interface, process graphics, retrieve data from memory or a remote computing device, such as a server, or perform other tasks. As a user navigates through, out of, and back to a client application 20, the activities 30 can present various user interfaces that offer different functionality.

In the Android® operating system 10, the "Activity" class provides a number of callbacks that allow an activity 30 to know that a state of the client application 20 has changed, such as when the operating system 15 creates, stops, or resumes an activity 30, or when the operating system 15 destroys the process 25 in which the activity 30 resides. The activities 30 can include startup activities 35a . . . 35n (collectively "startup activities 35"). Startup activities 35 are conventionally the first one of the activities 30 executed when a client application 20 is opened on the client device 10.

Each of the client applications 20 can further include content providers 38a . . . 38n (collectively "content providers 38") that manage access to data stored by the client application 20 or by other client applications 20. The content providers 38 can share data among the client applications 20 in some examples. In other words, content providers 38 include a data sharing interface that connects a client application 20 running in one process 25 with a client application running in another process 25.

Further, the client applications 20 can include application services 40a . . . 40n (collectively "application services 40") that can perform operations in a background process or, in other words, operations that do not require or display a user interface. In some examples, the application services 40 can include background processes that send and request data over a network, play audio files, perform file input/output (I/O) operations, or interact with a content provider 38.

As each of the client applications 20 has a one-to-one relationship with a process 25 running in the operating system 15, the operating system 15 makes it difficult for developers trying to accomplish particular tasks. For instance, due to the one-to-one relationship between a client application 20 and a process 25, the operating system 15 prohibits multiple instances of the same client application 20 from being opened on the same client device 10. Moreover, by implementing multiple instances, an architecture must be defined such that the use of global or static variables are facilitated.

Figure 2A:
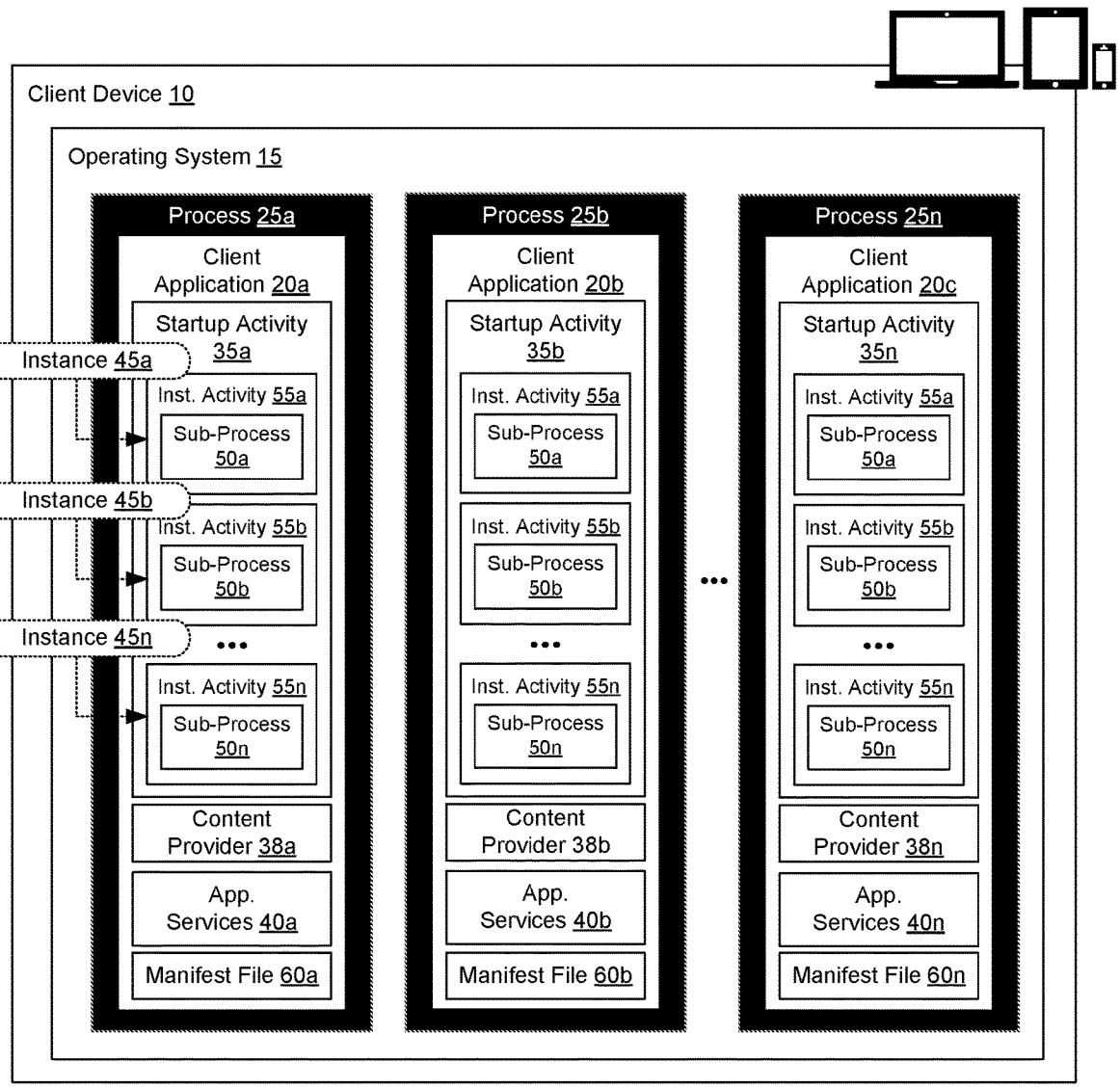
FIGS. 2A and 2B are schematic diagrams for providing multiple instances of a client application despite limitations imposed by an operating system.
Figure 2B:
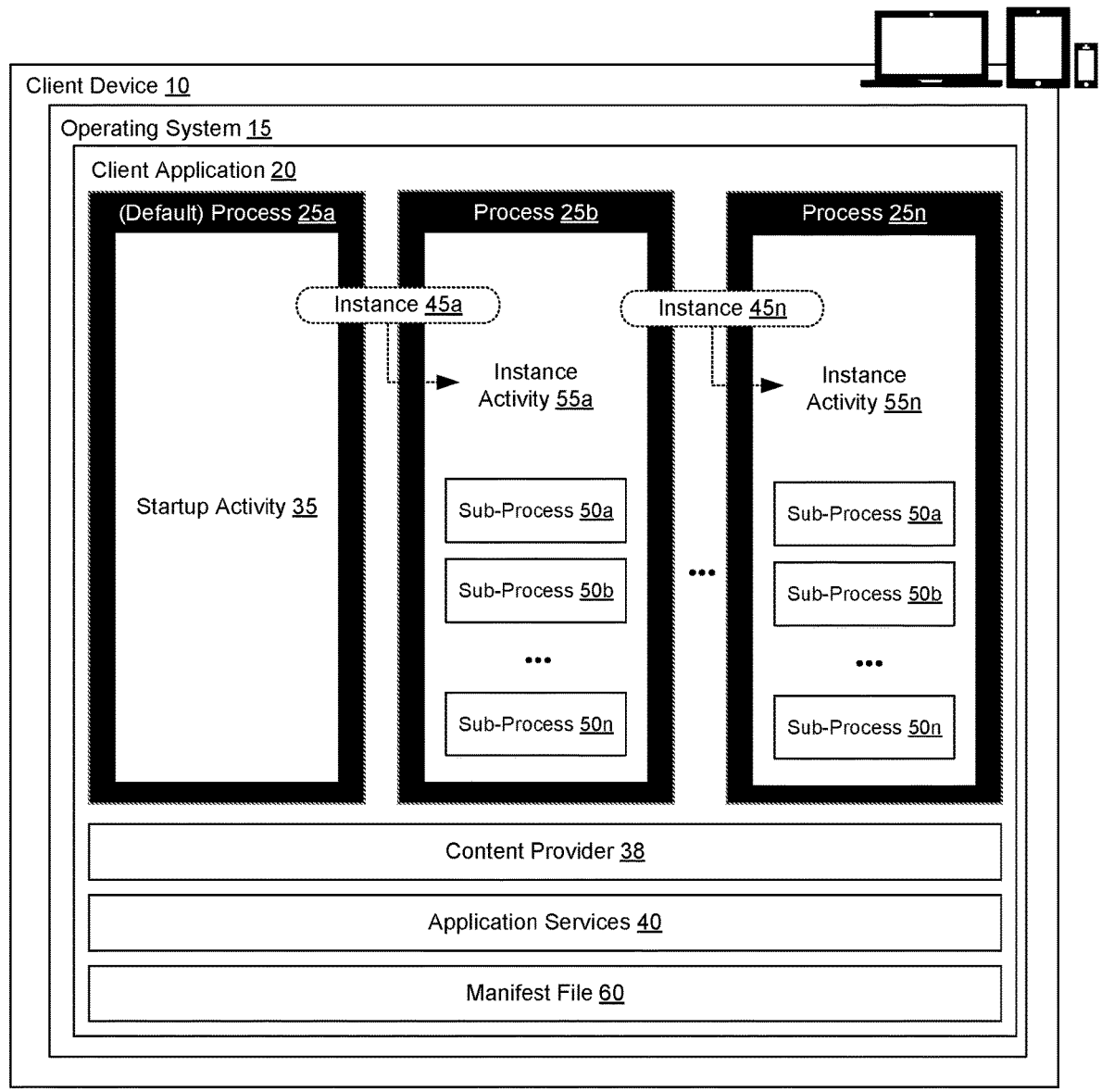

Referring next to FIGS. 2A and 2B, examples of software architecture diagrams are shown for executing multiple instances 45a ... 45n (collectively "instances 45") of the same client application 20 in an operating system 15 to overcome the difficulties presented by the one-to-one relationship between a client application 20 and a process 25. Instances 45 may refer to multiple and independent executions of a client application 20 that do not require separate installations of the client application 20. For example, a user can have a single client application 20 installed on his or her client device 10 that allows the client device 10 to establish a remote desktop session provided by a server or like computing device. According to the examples described herein, the user can execute multiple instances of the client application 20, for instance, to run concurrent virtual desktop sessions without having to have multiple virtual desktop applications installed on the client device 10.

In various examples, the client application 20 can be configured to generate sub-processes 50a ... 50n (collectively "sub-processes 50") for executing multiple instances 45 of a client application 20. For instance, each of the sub-processes 50 can be dedicated to executing a separate instance 45 of a client application 20. Similar to the processes 25, the sub-processes 50 can include threads that can be processed sequentially or in parallel using computing resources of the client device 10.

To spawn the sub-processes 50, the client application 20 can include a startup activity 35 configured to generate one or more instance activities 55a ... 55n (collectively "instance activities 55"). The startup activity 35 and the instance activities 55 can include routines or functions in various examples. For instance, a startup activity 35 can include a routine named "AppActivity," which can be the first routine carried out when a client application 20 is executed. The startup activity 35 does not need to be extend from or include AppActivity; however, it may be employed to start the instance activities 55. In some examples, instance activities 55 can be extended from AppActivity such that functions or routines of the instances 45 are only required to be implemented in AppActivity. In some examples, the startup activity 35 can display at least one user interface on the client device 10 that permits creation of one or more new instances 45 of a client application 20 or permits selection of currently active instances 45 of the client application 20. For instance, the user interface can be used by an end user to toggle between the different instances 45 of a client application 20. Similarly, the user interface can be used to create or terminate instances 45 of the client application 20.

The instance activities 55 can include classes or sub-routines that "extend from" AppActivity which can be named "InstanceActivity$_a$," "InstanceActivity$_b$," ... "InstanceActivity$_n$," for illustration purposes. In other words, the sub-routines use class inheritance to inherit variables and routines from the AppActivity routine. The number of "InstanceActivity" sub-routines can be equal to the number of supported instances 45 of the client application 20 permitted to be executed. The instance activities 55 oversee the default functionality of the client application 20, while being carried out in different sub-processes 50. For instance, assuming a client application 20 is a social networking application, "InstanceActivity$_a$," could oversee functionality for a personal social networking account while "InstanceActivity$_b$," could oversee functionality for an enterprise social networking account. As the instance activities 55 are sub-routines of the startup activity 35, any global variables can be shared among the instance activities 55. In other words, instances 45 of the client application 20 can share data among each other without having to utilize a content provider 38.

For some operating systems 15, such as Android®, the client applications 20 must include manifest files 60a ... 60n (collectively "manifest files 60") in order for the client applications 20 to become suitable for download, installation, or execution. In some examples, a manifest file 60 can include an extensible markup language (XML) document that includes information pertaining to the client application 20, such as required hardware or software resources, an application package name, definitions of activities 30, application services 40, and content providers 38, as well as other information. In some examples, an application store, such as Google® Play, can utilize the manifest file 60 to present information pertaining to the client application 20 for download, such as the required hardware or software resources.

To direct the operating system 15 to carry out the sub-processes 50, the manifest files 60 can include definitions of the instance activities 55 as well as corresponding sub-processes 50. For example, a manifest file 60 can include a definition that InstanceActivity$_a$ is associated with Sub-Process$_a$, a definition that InstanceActivity$_b$ is associated with Sub-Process$_b$, and so forth. As such, the operating system 15 can instantiate sub-processes 50 for each instance activity 55 class or, in other words, for each instance 45 of the client application 20.

Further, the instance activities 55 can also maintain a state of the instances 45 of the client application 20. For instance, a particular screen of a client application 20, as well as the information shown thereon, can be saved in the event that the user navigates away from the client application 20 to the operating system 15 or to another client application 20. In the event the user returns to a particular instance 45 of the client application 20, the prior state of the client application 20 can be shown.

Figure 3:
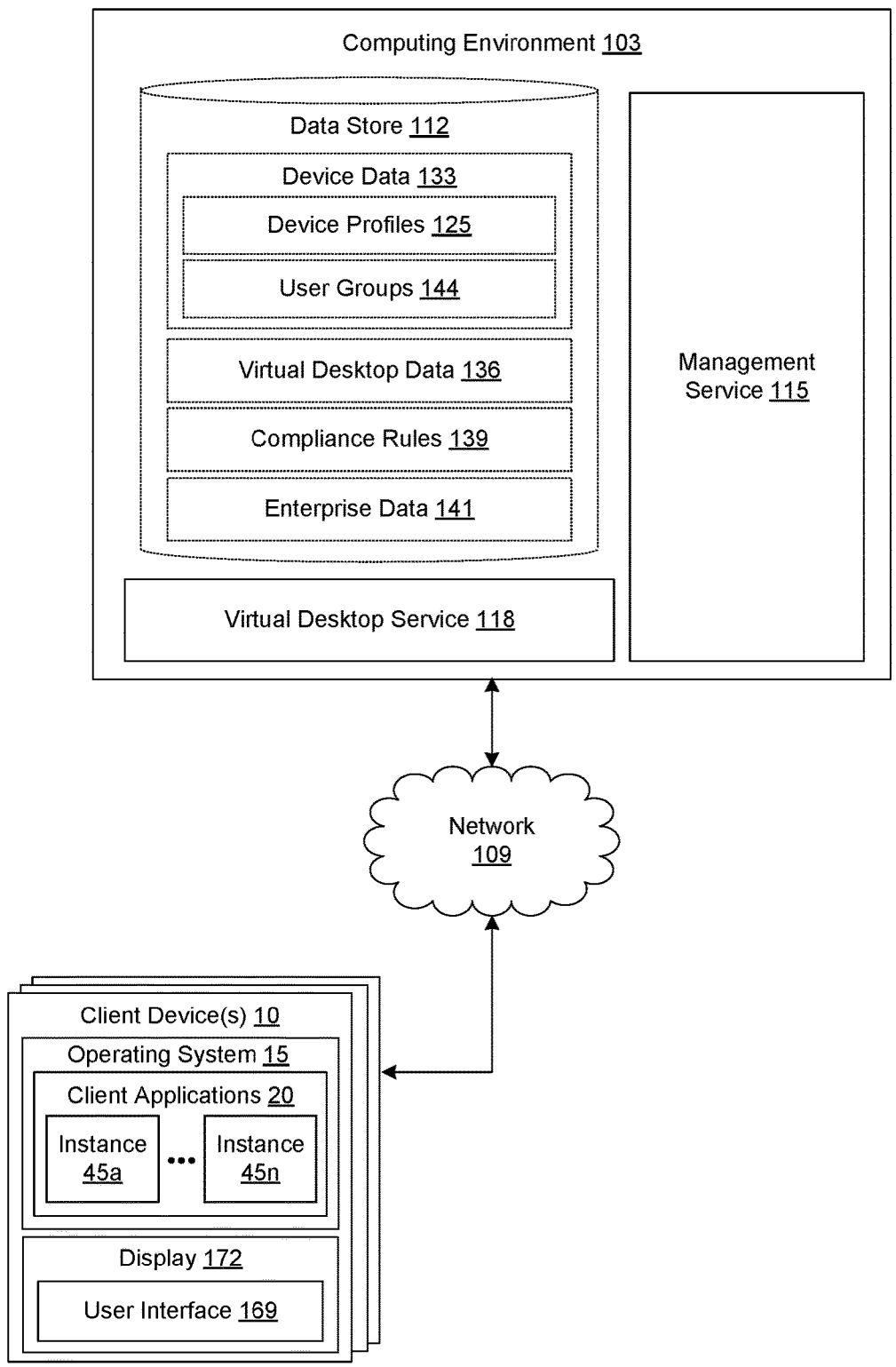
FIG. 3 is a drawing of a networked environment for providing multiple instances of a client application on a client device.

Referring next to FIG. 3, shown is an example of a networked environment 100. The networked environment 100 can include a computing environment 103 and one or more client devices 10 in data communication with one other over a network 109. The network 109 can include, for example, the Internet, intranets, extranets, wide area networks (WANs), local area networks (LANs), wired networks, wireless networks, other suitable networks, or any combination of two or more such networks. For example, the networks can include satellite networks, cable networks, Ethernet networks, telephony networks, and other types of networks.

The computing environment 103 can include, for example, a server computer or any other system providing computing capability. Alternatively, the computing environment 103 can include a plurality of computing devices that are arranged, for example, in one or more server banks, computer banks, or other arrangements. The computing environments 103 can include a grid computing resource or any other distributed computing arrangement. The computing devices can be located in a single installation or can be distributed among many different geographical locations.

The computing environments 103 can also include or be operated as one or more virtualized computer instances. For purposes of convenience, the computing environment 103 is referred to herein in the singular. Even though the computing environment 103 is referred to in the singular, it is understood that a plurality of computing environments 103 can be employed in the various arrangements as described above. As the computing environment 103 communicates with the client device 10 remotely over the network 109, the computing environment 103 can be described as a remote computing environment 103.

The data store 112 can include memory of the computing environment 103, mass storage resources of the computing environment 103, or any other storage resources on which data can be stored by the computing environment 103. The data stored in the data store 112, for example, can be associated with the operation of the various applications or functional entities described below.

The components executed on the computing environment 103 can include, for example, a management service 115, a virtual desktop service 118, as well as other applications, services, processes, systems, engines, or functionality not discussed in detail herein. The management service 115 can be executed to oversee the operation of client devices 10 enrolled with the management service 115. In some examples, an enterprise, such as a company, organization, or other entity, can operate the management service 115 to oversee or manage the operation of the client devices 10 of its employees, contractors, customers, or other users having accounts with the enterprise.

The management service 115 can cause various software components to be installed on a client device 10. Such software components can include, for example, client applications 20, resources, libraries, drivers, device configurations, or other similar components that require installation on the client device 10 as specified by an administrator of the management service 115. The management service 115 can further cause policies to be implemented on a client device 10. Policies can include, for example, restrictions or permissions pertaining to capabilities of a client device 10 such that access to enterprise data is secured on the client device 10.

The management service 115 can interact with one or more client applications 20 executed on the client devices 10. In one example, the management service 115 interacts with an agent application on the client device 10 to enroll the client device 10 with the management service 115. The agent application can include a client application 20 that can be registered as a device administrator of the client device 10, which can provide the agent application with sufficient privileges to control the operation of the client device 10. The agent application can configure a client device 10 in accordance with a data structure provided to the client device 10, referred to as a device profile.

The virtual desktop service 118 can include a service that executes a desktop in the computing environment 103 using the computing resources of the computing environment 103 while providing the desktop to an end user on a client device 10. In some examples, the virtual desktop service 118 can spawn one or more virtual machines that carry out operations associated with virtual desktop sessions.

The data stored in the data store 112 can include, for example, device data 133, virtual desktop data 136, compliance rules 139, enterprise data 141, as well as other data. Generally, device data 133 can include data pertaining to a client device 10 enrolled or managed by the management service 115. Device data 133 can include device profiles 125 as well as user groups 144. Device profiles 125 can include, for example, settings or other data generated by an administrator that deploys specified settings, client applications 20, resources, policies, or other data to a client device 10.

In one example, the management service 115 can generate one or more user interfaces that obtain information about the configuration of client devices 10 enrolled (or to be enrolled) with the management service 115. An administrator can provide information regarding how the administrator desires to configure the client devices 10. In one example, the administrator can specify one or more client applications 20 to be installed on the client device 10. In another example, the administrator can specify settings to be configured on a client device 10, such as Wi-Fi network settings, VPN settings, email server settings, or other settings. Based on the settings specified by the administrator, the management service 115 can generate a device profile 125 that is published for one or more client devices 10. When published, the agent application on a client device 10 can identify the device profile 125 as being applicable to the client device 10 and, as a result, will configure the client device 10 in accordance with the settings set forth in the device profile 125.

The computing environment 103 can include compliance rules 139, which are constraints specified by an administrator for a client device 10 to be in "compliance" with the management service 115. In one example, the agent application can configure hardware or software functionality of a client device 10 such that the client device 10 operates in conformance with the compliance rules 139. Additionally, the agent application can identify when the client device 10 is not in conformance with the compliance rules 139 and can take appropriate remedial actions, such as denying access to enterprise data 141 or other features of the agent application.

In some examples, the management service 115 communicates with the agent application or other client application 20 executable on the client device 10 to determine whether vulnerabilities exist on the client device 10 that do not satisfy policies defined by an administrator. Vulnerabilities can include, for example, the presence of a virus or malware on the client device 10, the client device 10 being "rooted" or "jailbroken" where root access is provided to a user of the client device 10, the presence of particular applications or files, questionable device configurations, vulnerable versions of client applications 20, or other vulnerability as can be appreciated.

The client device 10 can include a processor-based system, such as a computer system, that can include a desktop computer, a laptop computer, a personal digital assistant, a cellular telephone, a smartphone, a set-top box, a music player, a tablet computer system, a game console, an electronic book reader, or any other device with like capability. The client device 10 can also be equipped with networking capability or networking interfaces, including a localized networking or communication capability, such as a near-field communication (NFC) capability, radio-frequency identification (RFID) read or write capability, or other localized communication capability.

The client device 10 can include an operating system 15 configured to execute various client applications 20, such as the agent application, as well as other applications. Some client applications 20 can access enterprise data 141 and other network content served up by the computing environment 103 or other servers, thereby rendering a user interface 169 on a display 172, such as a liquid crystal display (LCD), touch-screen display, or other type of display device. To this end, some client applications 20 can include a browser or a dedicated application, and a user interface 169 can include a network page, an application screen, or other interface. Further, other client applications 20 can include device management applications, enterprise applications, social networking applications, word processors, spreadsheet applications, media viewing application, or other applications. In additional examples, the client applications 20 can serve up virtual desktop sessions from the virtual desktop service 118.

Referring next to FIG. 4A, an example of a client device 10 is shown having an operating system 15 executing thereon. The operating system 15 can include an application launcher 200 in some examples that permit an end user to select one or more client applications 20a . . . 20n for execution. When a client application 20 is selected by the end user, the operating system 15 spawns a process 25 that executes the selected application, for instance, in a Dalvik virtual machine. As the operating system 15 imposes a one-to-one restriction between a client application 20 and a process 25, the operating system 15 prohibits additional instances 45 of the client application 20 from being executed.

Referring now to FIG. 4B, in the event the end user selects a social networking application icon from the application launcher 200, a user interface 169 is shown for a single instance of the client application 20c. If a user were to return to the application launcher, shown in FIG. 4A, and again selects the social networking application icon, the client application 20c already executing on the client device 10 would merely become active in the operating system 15 and shown in the display 172. Another instance 45 of the same client application 20 would not be spawned.

Figure 5A:
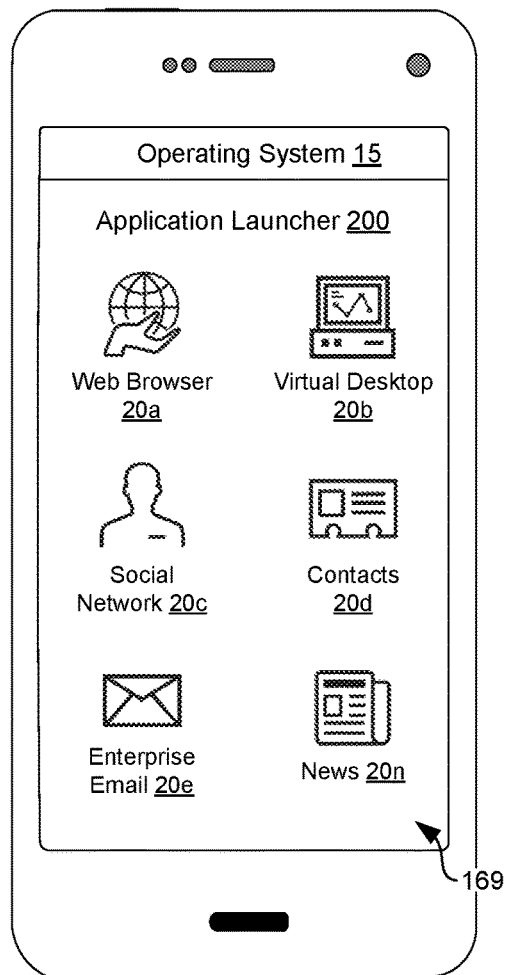
FIG. 5A is another drawing of the application launcher of the conventional operating system to launch one or more client applications installed on the client device.

Moving on to FIG. 5A, another example of a client device 10 is shown having an operating system 15 executing thereon. Similar to the example shown in FIG. 4A, the operating system 15 can include an application launcher 200 in some examples that permit an end user to select one or more client applications 20a . . . 20n for execution. When a client application 20 is selected by the end user, the operating system 15 spawns a process 25 that executes the selected application, for instance, in a Dalvik virtual machine. For instance, if the social networking-type of client application 20c is selected by the end user, the operating system 15 spans a single process 25 for the client application 20c.

Figure 5B:
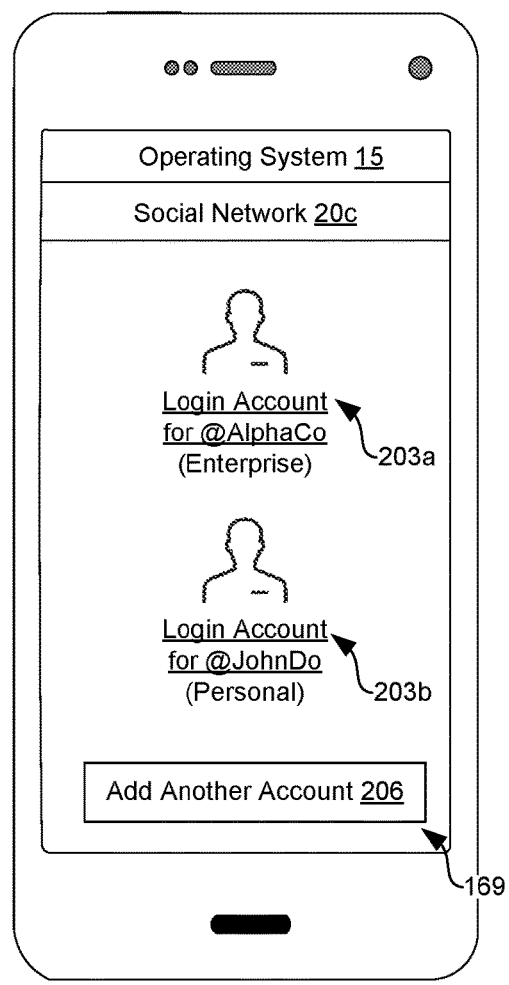
FIG. 5B is an example of a user interface for a client application that enables an end user of the client device to select creation of or toggling between one or more instances of the client application.

Turning now to FIG. 5B, a client application 20c is shown being configured to show a user interface 169 that permits a selection of different instances 45 of the client application 20c. For example, in FIG. 5B, the end user can choose to log-in to an enterprise social networking account ("@AlphaCo") or a personal social networking account ("@JohnDoe"). Assuming the end user selects icon 203a, the client application 20c may spawn (or use an existing) sub-process 50 for execution of a first instance 45 of the client application 20c. However, while the first instance 45 is active on the client device 10, the end user can return to the user interface 169 of FIG. 5B, for instance, to spawn another instance 45 of the client application 20c. Assuming the end user selects icon 203b, the client application 20c may spawn another (or use an existing) sub-process 50 for execution of a second instance 45 of the client application 20c. By selecting button 206, the end user can add one or more accounts which, in turn, can permit execution of additional instances 45 of the client application 20.

Figure 5C:
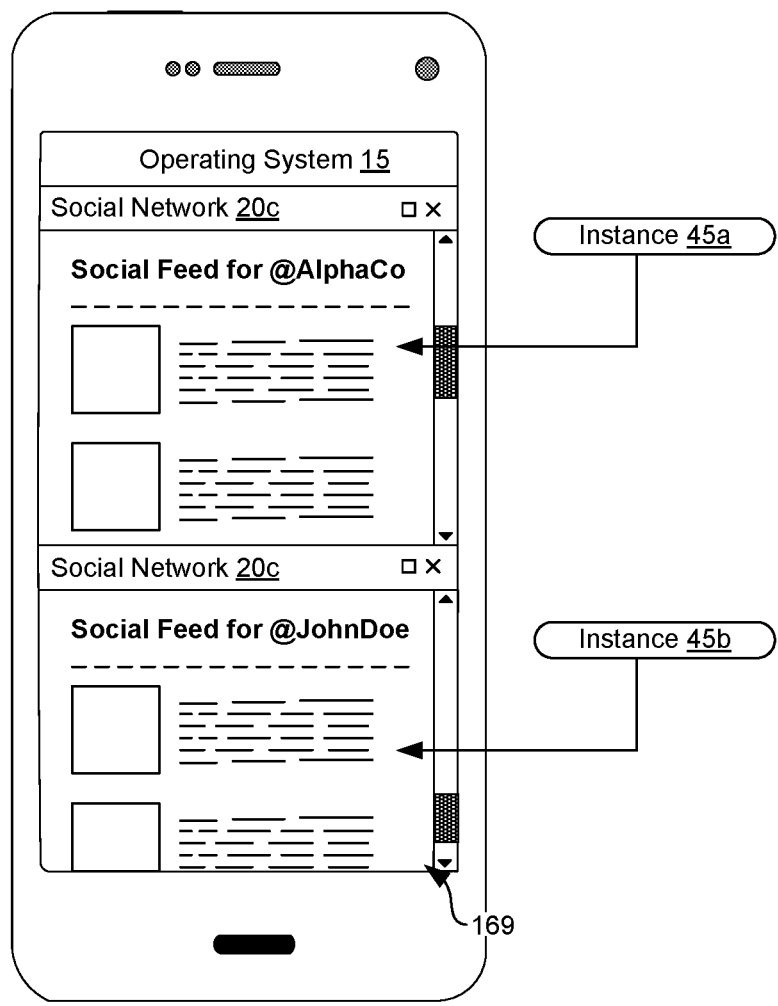
FIG. 5C is an example of a client device concurrently executing multiple instances of the social networking-type of client application.

Referring next to FIG. 5C, the client device 10 is shown having a first instance 45a of the client application 20c active in a first portion of the display 172 with a second instance 45b of the client application 20c active in a second portion of the display 172. Thus, in some examples, various instances 45 of the same client application 20 can be shown in the display 172 at the same time. However, in other examples, various instances 45 can be executed on the client device 10 without being shown on the display 172 concurrently. For instance, an end user can navigate to the user interface 169 of FIG. 5B, or other appropriate user interface component, to toggle between various instances 45 of the client application 20 that utilize all or a portion of a size of the display 172.

Figure 6:
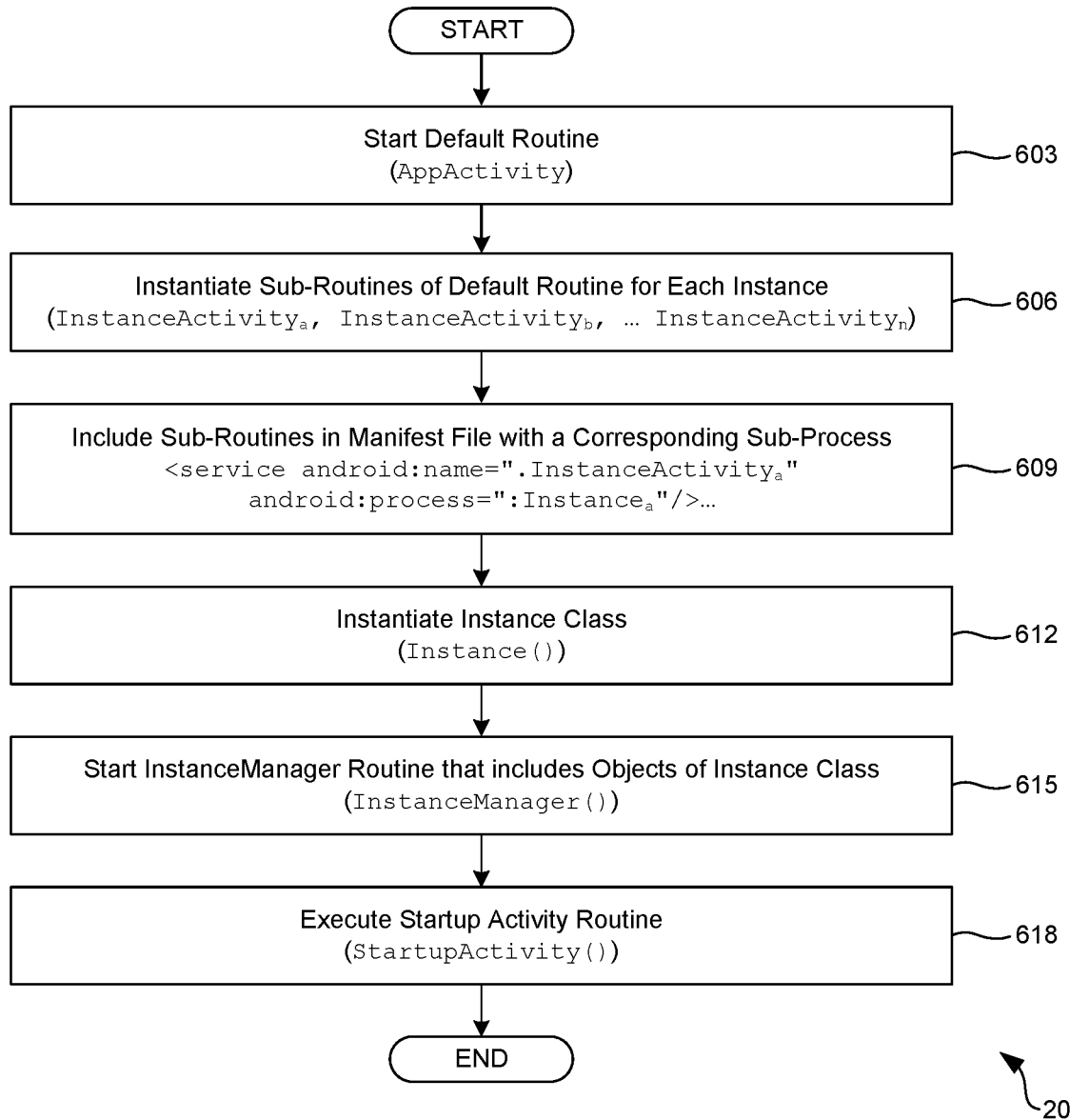
FIG. 6 is a flowchart for configuring a client application to generate multiple instances while being executed in a single process of the operating system.

Moving on to FIG. 6, shown is a flowchart that provides one example of configuring a client application 20 to generate multiple instances despite prohibitions imposed by the operating system 20 in executing a client application 20 is a single process 25. The flowchart of FIG. 6 can be viewed as depicting an example of elements of a method implemented by the client application 20 executing in the client device 10 according to one or more examples. The separation or segmentation of functionality as discussed herein is presented for illustrative purposes only.

Beginning with step 603, the client application 20 can start a default routine. For illustration purposes, the default routine can be referred to as "AppActivity," although it is understood that the default routine can assume other routine names. It is understood that, when the client application 20 is executed by the end user, the operating system 15 will spawn a single process 25 that starts from the "AppActivity" routine.

Next, in step 606, the client application 20 can instantiate sub-routines of the default routine ("AppActivity") that are configured to manage different instances 45 of the client application 20, referred to as instance activities 55. In some examples, the instance activities 55 can include sub-routines that "extend from" AppActivity, which can be referred to as "InstanceActivity$_a$," "InstanceActivity$_b$," . . . "InstanceActivity$_n$," for illustration purposes.

In some examples, the instance activities 55 are sub-routines that implement class inheritance to inherit variables and routines from the AppActivity routine. The number of "InstanceActivity" sub-routines can be equal to the number of supported instances 45 of the client application 20 permitted to be executed.

The instance activities 55 oversee the default functionality of the client application 20 while being carried out in different sub-processes 50. For example, assuming a client application 20 is an email application, "InstanceActivity$_a$," could be tasked with overseeing functionality for a personal email account while "InstanceActivity$_b$," could be tasked with overseeing functionality for an enterprise email account. As the instance activities 55 are sub-routines of the startup activity 35, any global variables can be shared among the instance activities 55. In other words, instances 45 of the client application 20 can share data among each other without having to utilize a content provider 38.

In some examples, the instance activity 55 can include an "onDestroy" routine for the sub-routine. It is understood that the "onDestroy" routine is performed when the end user directs the client application 20 or the operating system 15 to destroy (or terminate execution) of an instance 45 of the client application 20. To this end, in some examples, the "onDestroy" routine can return an instance identifier, which includes an identifier that uniquely identifies an instance 45 of the client application 20. Further, in some examples, the "onDestroy" routine can return an identifier specific to an account used in the instance 45 of the client application 20. The identifier can include, for example, an identifier that uniquely identifies a social networking account or an email account. In other examples, the identifier can include a network address for a remote desktop session. In further examples, the "onDestroy" routine can perform an "INSTANCE_QUIT" broadcast message to notify the AppActivity routine (such as the startup activity 35 or an instance manager), or other routines, that an instance 45 of the client application 20 has been terminated. The AppActivity can use the identifiers to determine which accounts and instances 45 of the client application 20 are active.

Next, in step 609, the client application 20 can include definitions of the instance activity 55 sub-routines in the manifest file 60. For instance, the definitions of the instance activity 55 can associate a particular instance activity 55 sub-routine with a corresponding sub-process 50 that will execute the sub-routine. An example of XML schema that can be used to associate a sub-routine, "InstanceActivity$_a$" with a corresponding sub-process "Instance$_a$" is provided below:
<service android:name=".InstanceActivityA" android:process=":InstanceA"/>
It is understood that the different sub-routines (instance activities 55) can each be associated with a corresponding sub-process 50. For example, "InstanceActivity$_b$" can be associated with a sub-process 50 named "Instance$_b$," "InstanceActivity$_c$" can be associated with a sub-process 50 named "Instance$_c$" and so forth.

Next, in step 612, the client application 20 can instantiate one or more "Instance" classes, which can include one more data structures used to manage different instances 45 of the client application 20 executing on the client device 10. The Instance class can include, for example, a unique identifier for an instance 45, a unique identifier for a corresponding sub-process 50, a variable indicating whether the instance 45 is active or available, as well as other information used to manage various instances 45 of the client application 20.

In step 615, the client application 20 can start an "InstanceManager" routine to oversee management of the instances 45 of the client application 20. The InstanceManager routine can include a routine defined in a Java® class in some examples. Further, in some examples, the InstanceManager routine can include a list of Java® objects or similar data structures of the Instance classes instantiated in step 612. As such, the InstanceManager maintains a list of available or active instances 45 of the client application 20. In further examples, the InstanceManager routine can include a routine, getAvailableInstance( ) configured to obtain available instances 45 of the client application 20 from the list, remove it from a list of available instances 45, and add it to a list of active instances 45.

In some examples, the InstanceManager routine can register with the Android® BroadcastReceiver class to receive messages predefined as INSTANCE_QUIT. To this end, if the InstanceManager receives an INSTANCE_QUIT message, the InstanceManager can obtain an identifier of the terminated instance 45 and identify the corresponding object in the list of active instances 45. The InstanceManager routine can remove the corresponding object from the list of active instances 45 and, for example, add the instance 45 to a list of free or available instances 45.

Next, in step 618, the client application 20 can execute a startup activity 35, which can be defined in the manifest file 60 as the default process. In other words, the startup activity 35 can be the first routine performed by the client application 20 when the client application 20 is executed. In various examples, the startup activity 35 can contain an instance of the InstanceManager class, while being configured to generate one or more user interfaces 169 to launch InstanceActivities, i.e., different instances 45 of the client application 20. An example of the user interface 169 is shown in FIG. 5B. For example, when an end user selects one of the icons 203a, 203b, the client application 20 can use the getAvailableInstance( ) routine of the InstanceManager to obtain an object of an instance 45 from a list of available instances 45 and launch an instance activity 55 using the object.

The instance activity 55 can oversee operation of the instance 45 of the client application 20 and perform the functions of the client application 20, such as social networking functions, email functions, virtual desktop functions, or other functions. In additional examples, some functionality of the client application 20 can be performed in the startup activity 35 routine, as opposed to the original AppActivity routine. In additional examples, the startup activity 35 can include a routine inherited from the AppActivity routine to obtain common functions, routines, and variables.

Figure 7:
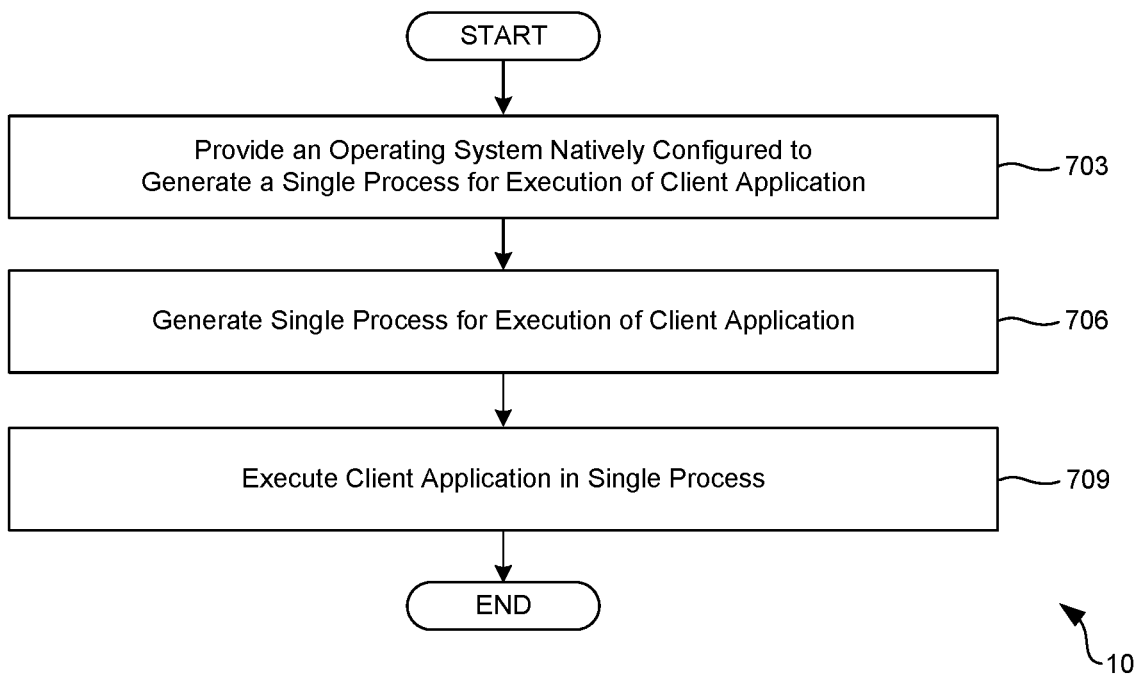
FIG. 7 is a flowchart for executing a client application in a single process.

Turning now to FIG. 7, shown is a flowchart that provides one example of functionality performed by a client device 10. The flowchart of FIG. 7 can be viewed as depicting an example of elements of a method implemented by the client device 10 according to one or more examples. The separation or segmentation of functionality as discussed herein is presented for illustrative purposes only.

In step 703, the client device 10 can provide an operating system 15 natively configured to generate a single process 25 for execution of a client application 20. For instance, the client device 10 can include an installation of an operating system 15 stored in memory of the client device 10 that is executed when the client device 10 is powered on. The operating system 15 can include the Android® operating system in various examples. As such, the operating system 15 may only provide a single process 25 for execution of the client application 20, making it difficult for developers trying to accomplish particular tasks or for end users to execute multiple instances of a client application 20. For instance, due to the one-to-one relationship between a client application 20 and a process 25, the operating system 15 prohibits multiple instances of the same client application 20 from being opened on the same client device 10.

In step 706, the client device 10 can generate a single process 25 for execution of a client application 20. In some examples, the operating system 15 of the client device 10 generates the single process 25, for instance, in response to a selection of the client application 20 from the application launcher 200 or similar utility.

In step 709, the client device 10 can execute the client application 20 in the single process 25. For instance, when a client application 20 is selected by the end user in the application launcher 200 or similar utility, the operating system 15 can spawn a process 25 that executes the selected client application 20, for instance, in a Dalvik or Java® virtual machine.

Figure 8:
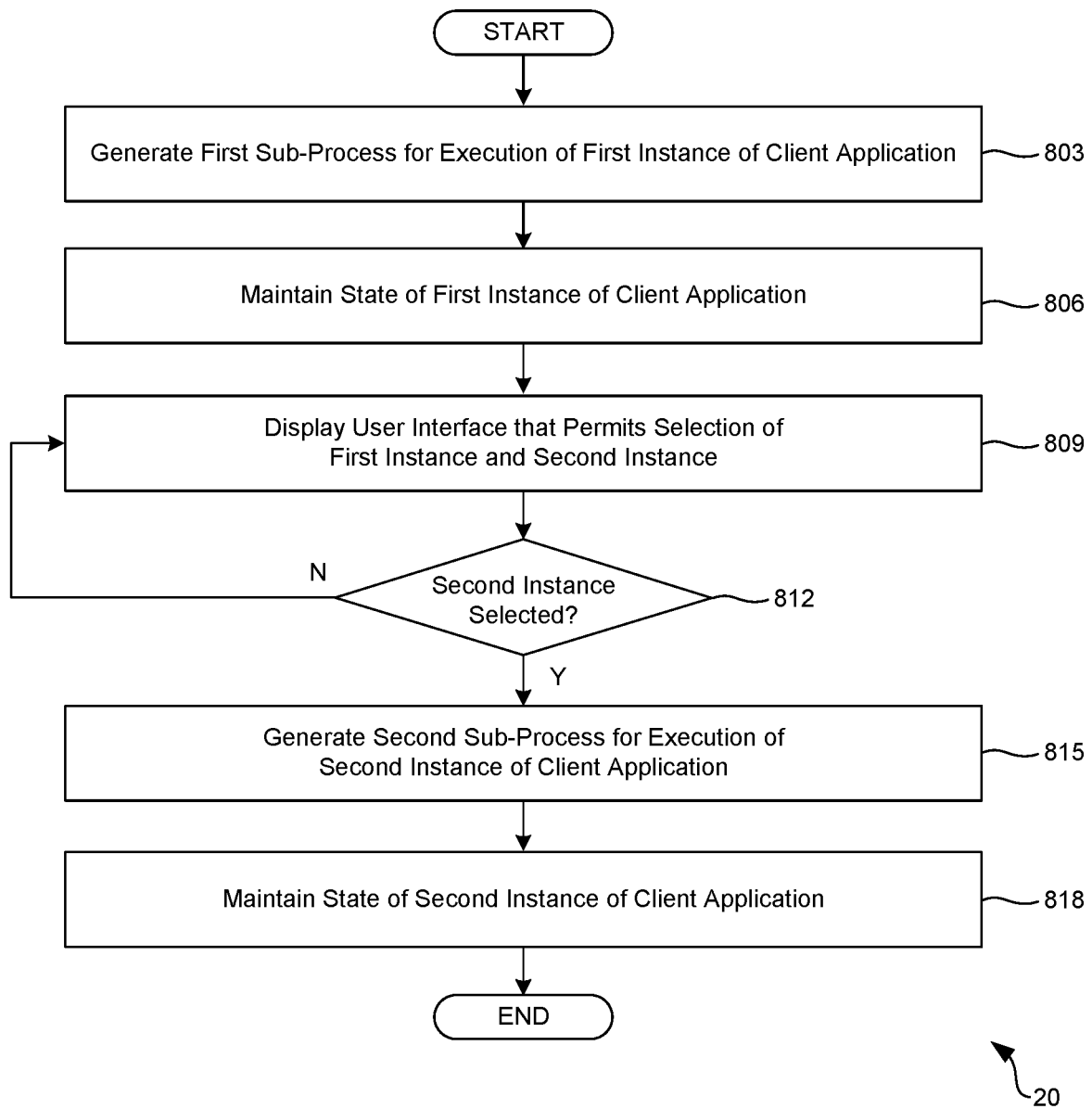
FIG. 8 is a flowchart for providing multiple instances of the client application.

Referring next to FIG. 8, shown is a flowchart that provides one example of functionality performed by a client device 10. The flowchart of FIG. 7 can be viewed as depicting an example of elements of a method implemented by a client application 20 configured in accordance with the various examples described herein. The separation or segmentation of functionality as discussed herein is presented for illustrative purposes only.

Beginning with step 803, the client application 20 can generate a first sub-process 50 for execution of a first instance 45 of the client application 20, for instance, in response to the client application 20 being selected from the application launcher 200 or similar utility. The sub-process 50 is referred to as such as it is a process within the operating system-level process 25. The first sub-processes 50 can be dedicated to executing only the first instance 45 of the client application 20 in some examples. Similar to the processes 25, the sub-processes 50 can include threads that can be processed sequentially or in parallel using computing resources of the client device 10. To spawn the first sub-process 50, the client application 20 can include a startup activity 35 configured to generate a first instance activity 55.

In step 806, the client application 20 can maintain a state of the first instance 45 of the client application 20. For instance, a particular screen of the instance 45 of the client application 20, as well as the information shown thereon, can be saved in the event that the user navigates away from the instance 45 of the client application 20 to the operating system 15, another client application 20, or another instance 45 of the same client application 20. In the event the user returns to a particular instance 45 of the client application 20, the prior state of the client application 20 can be shown.

In step 809, the client application 20 can display at least one user interface 169 that permits a selection of the first instance 45 of the client application 20, a second instance 45 of the client application 20, as well as additional instances 45. In some examples, the client application 20 can include a startup activity 35 being the first routine carried out when a client application 20 is executed. The startup activity 35 can display the user interface 169 on the client device 10 that permits creation of one or more new instances 45 of a client application 20 or permits selection of currently active instances 45 of the client application 20. For instance, the user interface 169 can be used by an end user to toggle between the different instances 45 of a client application 20. An example of the user interface 169 is shown in FIG. 5B. Similarly, the user interface 169 can be used to terminate active instances 45 of the client application 20.

In step 812, the client application 20 can determine whether the second instance 45 of the client application 20 has been selected. For instance, the client application 20 can determine whether the icon 203b has been selected or otherwise manipulated. If the second instance 45 of the client application 20 has been selected, the process can revert to step 809 to continue maintaining the state of the first instance 45 of the client application 20. Alternatively, if the user has selected a user interface component indicating a desire to create a second (or additional) instance 45 of the client application 20, the process can proceed to step 815.

In step 815, the client application 20 can generate a second sub-process 50 for execution of the second instance 45 of the client application 20. The second sub-processes 50 can be dedicated to executing only the second instance 45 of the client application 20 in some examples while executing concurrently with the first sub-process 50.

To direct the operating system 15 to carry out the sub-processes 50, the manifest files 60 of the client application 20 can include definitions of the instance activities 55 as well as corresponding sub-processes 50. For example, a manifest file 60 can include a definition that InstanceActivity$_a$ is associated with Sub-Process$_a$, a definition that InstanceActivity$_b$ is associated with Sub-Process$_b$, and so forth. As such, the operating system 15 can instantiate sub-processes 50 for each instance activity 55 class or, in other words, for each instance 45 of the client application 20.

In step 818, the client application 20 can maintain a state of the second instance 45 of the client application 20. As noted above, the client application 20 can include routines or sub-routines, referred to as instance activities 55, which maintain a state of the instances 45 of the client application 20. For instance, a particular screen of the second instance 45 of the client application 20, as well as the information shown thereon, can be saved in the event that the user navigates away from the client application 20 to the operating system 15 or to another client application 20. In the event the user returns to a particular instance 45 of the client application 20, the prior state of the client application 20 can be shown. Thereafter, the process can proceed to completion. While being illustrated with a first sub-process 50 and a second sub-process 50, it is understood that additional sub-processes 50 can be spawned to generate additional instances 45 of the client application 20 on the same client device 10.

The client devices 10 or devices comprising the computing environment 103 can include at least one processor circuit, for example, having a processor and at least one memory device, both of which are coupled to a local interface, respectively. The device can include, for example, at least one computer, a mobile device, smartphone, computing device, or like device. The local interface can include, for example, a data bus with an accompanying address/control bus or other bus structure.

Stored in the memory device are both data and several components that are executable by the processor. In particular, stored in the one or more memory devices and executable by the device processor can be the client application 20, and potentially other applications. Also stored in the memory can be a data store 112 and other data.

A number of software components are stored in the memory and executable by a processor. In this respect, the term "executable" means a program file that is in a form that can ultimately be run by the processor. Examples of executable programs can be, for example, a compiled program that can be translated into machine code in a format that can be loaded into a random access portion of one or more of the memory devices and run by the processor, code that can be expressed in a format such as object code that is capable of being loaded into a random access portion of the one or more memory devices and executed by the processor, or code that can be interpreted by another executable program to generate instructions in a random access portion of the memory devices to be executed by the processor. An executable program can be stored in any portion or component of the memory devices including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Memory can include both volatile and nonvolatile memory and data storage components. Also, a processor can represent multiple processors and/or multiple processor cores, and the one or more memory devices can represent multiple memories that operate in parallel processing circuits, respectively. Memory devices can also represent a combination of various types of storage devices, such as RAM, mass storage devices, flash memory, or hard disk storage. In such a case, a local interface can be an appropriate network that facilitates communication between any two of the multiple processors or between any processor and any of the memory devices. The local interface can include additional systems designed to coordinate this communication, including, for example, performing load balancing. The processor can be of electrical or of some other available construction.

The client devices 10 can include a display 172 upon which a user interface 169 generated by the client application 20 or another application can be rendered. In some examples, the user interface 169 can be generated using user interface data provided by the computing environment 103. The client device 10 can also include one or more input/ output devices that can include, for example, a capacitive touchscreen or other type of touch input device, fingerprint reader, or keyboard.

Although the management service 115, the client application 20, and other various systems described herein can be embodied in software or code executed by general-purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include discrete logic circuits having logic gates for implementing various logic functions upon an application of one or more data signals, application specific integrated circuits (ASICs) having appropriate logic gates, field-programmable gate arrays (FPGAs), or other components.

The sequence diagram and flowcharts show an example of the functionality and operation of an implementation of portions of components described herein. If embodied in software, each block can represent a module, segment, or portion of code that can include program instructions to implement the specified logical function(s). The program instructions can be embodied in the form of source code that can include human-readable statements written in a programming language or machine code that can include numerical instructions recognizable by a suitable execution system such as a processor in a computer system or other system. The machine code can be converted from the source code. If embodied in hardware, each block can represent a circuit or a number of interconnected circuits to implement the specified logical function(s).

Although the sequence diagram flowcharts show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some examples, one or more of the blocks shown in the drawings can be skipped or omitted.

Also, any logic or application described herein that includes software or code can be embodied in any non-transitory computer-readable medium for use by or in connection with an instruction execution system such as, for example, a processor in a computer system or other system. In this sense, the logic can include, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can include any one of many physical media, such as magnetic, optical, or semiconductor media. More specific examples of a suitable computer-readable medium include solid-state drives or flash memory. Further, any logic or application described herein can be implemented and structured in a variety of ways. For example, one or more applications can be implemented as modules or components of a single application. Further, one or more applications described herein can be executed in shared or separate computing devices or a combination thereof. For example, a plurality of the applications described herein can execute in the same computing device, or in multiple computing devices.

It is emphasized that the above-described examples of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure.

Therefore, the following is claimed:

1. A system for providing multiple instances of a client application, comprising:
   a client device comprising at least one hardware processor; and
   program instructions executable in the client device that, when executed by the client device, cause the client device to:
      provide an operating system natively configured to generate a single process for an execution of the client application on the client device based on an interpretation of a manifest file of the client application;
      in response to an indication to execute the client application, generate the single process for the execution of a default routine of the client application, wherein the default routine of the client application is configured to, in the single process:
         generate a first sub-process for execution of a first instance of the client application, the first sub-process being a first sub-routine extending from the default routine and having a corresponding process attribute in the manifest file;
         generate a second sub-process for execution of a second instance of the client application, the second sub-process being a second sub-routine extending from the default routine and having a corresponding process attribute in the manifest file; and
      maintain a first state of the first instance and a second state of the second instance; and
      display at least one user interface that permits a selection of the first instance of the client application or the second instance of the client application.

2. The system of claim 1, wherein the client application comprises a startup activity routine that is performed in response to an initial execution of the client application in the single process, the startup activity routine being configured to:
   provide the at least one user interface that permits the selection of the first instance of the client application or the second instance of the client application; or
   make active the first instance of the client application or the second instance of the client application.

3. The system of claim 2, wherein the selection of the first instance of the client application in the at least one user interface makes the first instance of the client application active in the operating system; and
   wherein the selection of the second instance of the client application in the at least one user interface makes the second instance of the client application active in the operating system.

4. The system of claim 2, wherein the client application comprises:
   a first startup activity sub-routine of the startup activity routine for execution of the first instance of the client application in the first sub-process; and
   a second startup activity sub-routine of the startup activity routine for execution of the second instance of the client application in the second sub-process.

5. The system of claim 1, wherein the first sub-process and the second sub-process each comprise an onDestroy routine comprising code that, when executed upon termination of a respective one of the multiple instances, returns an identifier corresponding to a terminated one of the multiple instances.

6. The system of claim 1, wherein:
   the first instance of the client application and the second instance of the client application are a portion of a plurality of instances of the client application; and
   the program instructions, when executed by the client device, further cause the client device to maintain a list comprising a plurality of data structures, individual ones of the plurality of data structures in the list corresponding to active ones of the plurality of instances of the client application.

7. The system of claim 1, wherein the operating system is a mobile operating system.

8. A non-transitory computer-readable medium for providing multiple instances of a client application embodying program code executable in a client device that, when executed by the client device, causes the client device to:
   provide an operating system natively configured to generate a single process for an execution of the client application on the client device based on an interpretation of a manifest file of the client application;
   in response to an indication to execute the client application, generate the single process for the execution of a default routine of the client application, wherein the default routine of the client application is configured to, in the single process:
      generate a first sub-process for execution of a first instance of the client application, the first sub-process being a first sub-routine extending from the default routine and having a corresponding process attribute in the manifest file;
      generate a second sub-process for execution of a second instance of the client application, the second sub-process being a second sub-routine extending from the default routine and having a corresponding process attribute in the manifest file; and
      maintain a first state of the first instance and a second state of the second instance; and
   display at least one user interface that permits a selection of the first instance of the client application or the second instance of the client application.

9. The non-transitory computer-readable medium of claim 8, wherein the client application comprises a startup activity routine that is performed in response to an initial execution of the client application in the single process, the startup activity routine being configured to:
   provide the at least one user interface that permits the selection of the first instance of the client application or the second instance of the client application; or
   make active the first instance of the client application or the second instance of the client application.

10. The non-transitory computer-readable medium of claim 9, wherein the selection of the first instance of the client application in the at least one user interface makes the first instance of the client application active in the operating system; and
   wherein the selection of the second instance of the client application in the at least one user interface makes the second instance of the client application active in the operating system.

11. The non-transitory computer-readable medium of claim 9, wherein the client application comprises:
   a first startup activity sub-routine of the startup activity routine for execution of the first instance of the client application in the first sub-process; and
   a second startup activity sub-routine of the startup activity routine for execution of the second instance of the client application in the second sub-process.

12. The non-transitory computer-readable medium of claim 8, wherein the first sub-process and the second sub-process each comprise an onDestroy routine comprising code that, when executed upon termination of a respective one of the multiple instances, returns an identifier corresponding to a terminated one of the multiple instances.

13. The non-transitory computer-readable medium of claim 8, wherein:
   the first instance of the client application and the second instance of the client application are a portion of a plurality of instances of the client application; and
   the program instructions, when executed by the client device, further cause the client device to maintain a list comprising a plurality of data structures, individual ones of the plurality of data structures in the list corresponding to active ones of the plurality of instances of the client application.

14. The non-transitory computer-readable medium of claim 8, wherein the operating system is a mobile operating system.

15. A computer-implemented method for providing multiple instances of a client application on a client device, comprising:
   providing an operating system natively configured to generate a single process for an execution of the client application on the client device based on an interpretation of a manifest file of the client application;
   in response to an indication to execute the client application, generating the single process for the execution of a default routine of the client application, wherein the default routine of the client application is configured to, in the single process:
      generate a first sub-process for execution of a first instance of the client application, the first sub-process being a first sub-routine extending from the default routine and having a corresponding process attribute in the manifest file;
      generate a second sub-process for execution of a second instance of the client application, the second sub-process being a second sub-routine extending from the default routine and having a corresponding process attribute in the manifest file; and
      maintain a first state of the first instance and a second state of the second instance; and
   displaying at least one user interface that permits a selection of the first instance of the client application or the second instance of the client application.

16. The computer-implemented method of claim 15, wherein the client application comprises a startup activity routine that is performed in response to an initial execution of the client application in the single process, the startup activity routine being configured to:

provide the at least one user interface that permits the selection of the first instance of the client application or the second instance of the client application; or make active the first instance of the client application or the second instance of the client application.

17. The computer-implemented method of claim 16, wherein the selection of the first instance of the client application in the at least one user interface makes the first instance of the client application active in the operating system; and wherein the selection of the second instance of the client application in the at least one user interface makes the second instance of the client application active in the operating system.

18. The computer-implemented method of claim 16, wherein the client application comprises:

a first startup activity sub-routine of the startup activity routine for execution of the first instance of the client application in the first sub-process; and a second startup activity sub-routine of the startup activity routine for execution of the second instance of the client application in the second sub-process.

19. The computer-implemented method of claim 15, wherein the first sub-process and the second sub-process each comprise an onDestroy routine comprising code that, when executed upon termination of a respective one of the multiple instances, returns an identifier corresponding to a terminated one of the multiple instances.

20. The computer-implemented method of claim 15, wherein the operating system is a mobile operating system.

* * * * *